(12) United States Patent
Champredonde et al.

(10) Patent No.: US 9,476,789 B2
(45) Date of Patent: Oct. 25, 2016

(54) SEALED PRESSURE-MEASURING MEMBER

(75) Inventors: Jonathan Champredonde, Vitoria (ES); Richard Leman, Matfield (GB); Mark Leman, Pembury (GB); Peter Smith, Hawkhurst (GB)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 1123 days.

(21) Appl. No.: 13/498,754

(22) PCT Filed: Sep. 30, 2010

(86) PCT No.: PCT/FR2010/052071
§ 371 (c)(1),
(2), (4) Date: Jun. 4, 2012

(87) PCT Pub. No.: WO2011/039486
PCT Pub. Date: Apr. 7, 2011

(65) Prior Publication Data
US 2012/0239313 A1 Sep. 20, 2012

(51) Int. Cl.
*G01L 19/08* (2006.01)
*G01L 17/00* (2006.01)
*G01L 19/06* (2006.01)
*B60C 23/04* (2006.01)

(52) U.S. Cl.
CPC ......... *G01L 19/086* (2013.01); *B60C 23/0493* (2013.01); *G01L 17/00* (2013.01); *G01L 19/0645* (2013.01)

(58) Field of Classification Search
None
See application file for complete search history.

(56) References Cited

U.S. PATENT DOCUMENTS

| 4,975,679 A | 12/1990 | Ballyns | 340/442 |
| 5,573,611 A | 11/1996 | Koch et al. | 152/152.1 |

(Continued)

FOREIGN PATENT DOCUMENTS

| CN | 2639038 Y | 9/2004 |
| EP | 1 508 295 A1 | 2/2005 |

(Continued)

OTHER PUBLICATIONS

Notification dated Nov. 25, 2014, from the RUPTO regarding Application No. 2012114817/28(022398).

(Continued)

*Primary Examiner* — Aditya Bhat
(74) *Attorney, Agent, or Firm* — Fitzpatrick, Cella, Harper & Scinto (57) ABSTRACT

A pressure-measurement device includes a pressure-measurement surface, which is functionally connected to a test body, and a sealed pressure-measurement housing in which the test body is arranged. The pressure-measurement surface is carried by a deformable wall of the sealed pressure-measurement housing lying at a distance from the test body. The sealed pressure-measurement housing delimits an internal space, which is a space internal to the sealed housing. The pressure-measurement device also includes a pressure-transmission object that transmits the pressure between the pressure-measurement surface and the test body. The pressure-transmission object includes a substantially incompressible material occupying all of the internal space. The pressure-measurement device further includes an energy source and a processor for processing pressure data detected by the test body. The processor is arranged in the sealed pressure-measurement housing.

18 Claims, 4 Drawing Sheets

(56) References Cited

U.S. PATENT DOCUMENTS

| | | | |
|---|---|---|---|
| 6,016,102 A | 1/2000 | Fortune et al. | 340/442 |
| 6,450,021 B1* | 9/2002 | Katou et al. | 73/146.5 |
| 6,931,934 B2 | 8/2005 | Gall et al. | 73/715 |
| 7,252,005 B2* | 8/2007 | Schulman | 73/700 |
| 8,262,372 B2* | 9/2012 | Wang | F04C 23/008 228/164 |
| 2006/0044118 A1 | 3/2006 | Katou et al. | 340/425.5 |
| 2008/0295933 A1 | 12/2008 | Lacour et al. | 152/152.1 |
| 2011/0259497 A1 | 10/2011 | Borot et al. | 152/450 |

FOREIGN PATENT DOCUMENTS

| | | |
|---|---|---|
| EP | 1 632 880 A1 | 3/2006 |
| JP | 2006-033689 A | 2/2006 |
| JP | 2006-074369 A | 3/2006 |
| RU | 2 049 314 C1 | 11/1995 |
| RU | 2 247 343 C2 | 2/2005 |

OTHER PUBLICATIONS

International Search Report dated May 25, 2011.

* cited by examiner

SEALED PRESSURE-MEASURING MEMBER

FIELD OF THE INVENTION

The present invention relates to the field of pressure sensors.

BACKGROUND

The invention applies, without being restricted thereto, to the measurement of tyre pressure, in particular for construction machinery tyres.

The prior art, notably U.S. Pat. No. 6,931,934, discloses a pressure-measurement member arranged inside the space delimited by the tyre and the rim. The member is of a passive type and comprises a protective housing. The member also comprises a test body and the housing comprises a wall supporting a pressure-measurement surface functionally connected to the test body. Specifically, this wall comprises an indentation designed so that the wall is positioned in contact with the test body. Under the effect of the external pressure applied to the wall, the indentation mechanically transmits the pressure to the test body which is therefore able to detect the pressure external to the member.

However, repeated mechanical loadings applied by the indentation to the test body upon contact therewith lead firstly to wear on the test body, thus impairing the pressure measurement, and secondly to detachment of the test body from its support, thus rendering the member unusable.

Further, because the member is of a passive type, each measurement member has to be calibrated once it has been manufactured, and this is therefore a painstaking and costly exercise. It also requires calibration data to be memorized in a processing unit belonging to the member. That increases the complexity and cost of the system. Further, the calibration data are a source of measurement errors.

It should also be noted that, when the member is not completely sealed throughout its entire life, it is not protected from chemical attack, notably from attack by the products used for maintaining the rims and the tyre. This prolonged exposure to chemical attack impairs the test body and therefore the pressure measurement.

SUMMARY OF THE INVENTION

The invention seeks to provide a reliable pressure-measurement member.

To this end, one subject of the invention is a pressure-measurement member, characterized in that it comprises:
- a pressure-measurement surface functionally connected to a test body,
- a sealed pressure-measurement housing in which the test body is arranged, the pressure-measurement surface being carried by a wall of the sealed pressure-measurement housing lying some distance from the test body, the sealed pressure-measurement housing delimiting a space internal to the housing;
- pressure-transmission means that transmit the pressure between the pressure-measurement surface and the test body and comprising a substantially incompressible material occupying all of the internal space; and
- energy storage means and pressure processing means for processing the pressure detected by the test body and arranged in the sealed housing.

Because the pressure-measurement surface lies some distance from the test body, i.e. because it is not in direct contact with the test body, the test body cannot become worn, or detached from its support under the effect of the repeated loadings on the pressure-measurement surface. Specifically, the substantially incompressible material both protects the test body and directly transmits the pressure from the pressure-measurement surface to the test body without these items ever being in direct contact. The pressure is transmitted directly which means to say that the pressure applied to the pressure-measurement surface is the pressure measured by the test body. No measurement offset is introduced by the material, and this notably makes it possible to dispense with the need to calibrate the member.

Furthermore, irrespective of the tyre pressure, the member according to the invention is able to measure pressures of as much as 16 bar, or even 30 bar if necessary. By occupying all of the internal space, the presence of air or some other material, for example a compressible material, that could disrupt the pressure detected by the test body, especially in the event of temperature variations, is excluded.

Furthermore, the sealed housing according to the invention is impermeable to liquids, solids and gases under the conditions of use of the member inside the tyre. The test body is therefore protected from chemical attack, notably from attack by the products used for maintaining the rims and tyres, notably in the construction industry. Thus, the test body cannot be damaged by anything external to the housing, because it is located inside the sealed housing.

Furthermore, the member allows the internal tyre pressure to be measured using the pressure-measurement surface which, being functionally connected to the test body, transmits the pressure to the test body without the latter being exposed to the elements external to the housing. Specifically, the wall of the housing is deformable which means that the pressure received by this wall on the outside of the housing can be measured by the test body. Such a member is intended to be positioned in the space delimited by the tyre and the rim. It is of no matter whether it is fixed to the rim or to the tyre.

In addition, the measurement member is of the active type. Thus, it does not need to be calibrated. Each member can therefore be manufactured quickly and at lower cost. Further, the pressure measured by the test body is transmitted to the processing means which are powered autonomously by the energy-storage means. The data are then transmitted from the processing means to outside the member. The measurement member is therefore autonomous, independent in terms of its supply of energy and capable of reliably transmitting the measured pressure.

It will be noted that the incompressibility of the material is defined at constant temperature. Thus, an incompressible material may have a volume that varies as a function of temperature. Thus, the deformability of the pressure-measurement wall allows the pressure measurement to be adapted to the variations in temperature. Specifically, when the temperature increases or decreases the material has a tendency to expand or to contract respectively. The deformability of the diaphragm allows it to accompany the variations in volume of the material as a function of temperature without impairing the pressure measurement.

Finally, the incompressible material of the member according to the invention makes it possible to avoid the pressure-measurement housing imploding as compared with a member comprising a housing containing only air which might implode under the effect of the difference in pressure between the outside and the inside of the housing.

For preference, the member comprises radio frequency communication means comprising an antenna outside the internal space occupied by the material. Because the antenna is situated outside the internal space, its radiating properties are maintained and are not impaired by the pressure-measurement housing or by the material.

Optionally, the sealed-pressure-measurement housing comprises a filling orifice for filling the housing and intended to be plugged by an electrically conducting plugging member to which the antenna is connected. The plugging member acts both as a plug to seal the housing and as a conductor for the electrical signal generated inside the housing to the antenna situated on the outside of the housing.

Advantageously, the wall of the housing is formed by a deformable diaphragm.

A diaphragm has suitable mechanical deformation features that allow it to be sensitive to the pressure in the tyre and the variations therein.

Advantageously, the wall of the sealed housing has concentric grooves.

For preference, the concentric grooves are equidistant from one another in pairs. Preferably, the wall of the sealed housing has, in cross section, at least one portion that displays a substantially sinusoidal profile. That improves the linearity of the response of the test body as compared with a sealed housing wall which, in cross section, displays a substantially planar profile.

As an option, the pressure-measurement surface is covered with an inert metal film, for example gold, palladium or platinum.

This layer makes it possible to avoid corrosion of the diaphragm and to preserve its mechanical properties.

Advantageously, the member comprises a support for the test body forming one wall of the sealed housing, made of ceramic.

Because the support is made of ceramic it is perfectly sealed and inert towards chemical attack, notably attack from the products used for maintaining rims and tyres, notably in the construction industry. Furthermore, cracks are likely to appear following expansions of the material of the support as a result of variations in temperature in the tyre. Because ceramic expands only to a very small degree, the appearance and spread of cracks in the support is minimized.

For preference, the material is in a liquid and/or gel phase in a temperature range of between −20° C. and +150° C. Thus, the material remains in a liquid and/or gel phase throughout the range of operating temperatures of the member and, within this range, maintains its properties of direct transmission of the pressure from the pressure-measurement surface to the test body. A gel behaves somewhere between a liquid and a solid.

According to one optional feature of the member, the antenna is encapsulated in a material that has a dielectric constant of between 1 and 5 (absolute value with respect to a vacuum). Such a material protects the antenna from chemical attack, notably from attack by products used for maintaining rims and tyres, particularly in the construction industry, and which are likely to be present inside the tyre.

Another subject of the invention is a pressure-measurement device, characterized in that it comprises a pressure-measurement member according to any one of the preceding claims and a protective housing to protect the pressure-measurement member.

The protective housing protects the member, notably the pressure-measurement surface, from knocks and from certain solid debris, for example stones.

Advantageously, the device comprises a support for positioning the pressure-measurement member in the protective housing, the protective housing comprising at least one protective wall facing the pressure-measurement surface, the protective housing and the support being arranged in such a way that the pressure-measurement surface is positioned some distance away from the protective wall or walls.

No wall of the housing is in contact with the pressure-measurement surface. The housing is thus able to make sure that no force other than the force associated with the pressure of the air inside the tyre is applied to the pressure-measurement surface.

Optionally, the protective housing comprises first and second parts which are separable from one another and arranged in such a way that they allow air to communicate between the outside and the inside of the protective housing when assembled.

The housing thus allows the air pressurized in the tyre to enter the protective housing so that the pressure can be detected by the pressure-measurement surface.

For preference, the protective housing comprises means for the dimensional filtration of the air entering the protective housing.

These filtering means ensure that only the smallest debris present in the tyre can come into contact with the pressure-measurement member. Given their small size, they are not likely to damage it, particularly the pressure-measurement surface.

Yet another subject of the invention is an assembly of a tyre and of a pressure-measurement member and/or device, characterized in that the pressure-measurement member and/or the pressure-measurement device is as defined hereinabove.

When positioned in the tyre, the pressure-measurement member experiences attack by the solid and liquid debris present in the tyre. In particular, debris may come into contact with the pressure-measurement surface and disrupt the reliability of the measurement. It is therefore necessary to protect the pressure-measurement member while at the same time allowing tyre pressure to be measured reliably.

A final subject of the invention is a protective housing for a tyre pressure-measurement member, characterized in that it comprises:

first and second parts that can be moved relative to one another between a position for inserting the member into the housing and a position for holding the member in the housing, the first and second parts being arranged in such a way that they allow air to communicate between the outside and the inside of the housing when they are in the holding position;

means for filtering the air entering the housing and comprising a space for the passage of air between the outside and the inside of the housing defined by the first and second parts.

Such a housing affords low-cost and effective protection to the pressure-measurement member. Specifically, because of the space, air is dimensionally filtered, which means that only liquids and solids of a size smaller than the passage space can enter the interior of the protective housing. The protective housing thus protects the pressure-measurement surface against impacts and against some solid debris.

Furthermore, because the passage is delimited by the first and second parts, there is no need to provide an air passage specific to each of the parts. The passage is formed at the time of assembly of the housing in its position in which it holds the member.

Optionally, the housing comprises bracing means between the first and second parts. The bracing means, in the holding position, ensure that the air passage space is defined.

For preference, the passage space has, in cross section, an overall profile in the shape of an elbow between the inside and the outside of the housing.

As an option, the air passage space is defined at least in part by a side wall of one of the first and second parts. The air passage space is defined at least in part by a skirt that overhangs the side wall. Thus the passage space makes it possible to maintain an air passage between the inside and the outside of the protective housing, even if the passage space is blocked with debris at a few isolated points. Indeed it is highly improbable that all of the passage space will become blocked so there is always an air passage between the inside and the outside of the housing thus allowing the tyre pressure to be measured correctly.

Advantageously, the overhanging skirt has a tapering profile. The tapering of the skirt gives it relative flexibility which allows the skirt to deform under the effect of the knocks and vibrations when using the protective housing. This then allows any debris that has become trapped in the passage space between the first and second parts or which has entered the protective housing to become dislodged and removed.

For preference, the overhanging skirt extends around the entire periphery of the corresponding part.

BRIEF DESCRIPTION OF THE DRAWINGS

The invention will be better understood from reading the description which will follow, which is given solely by way of nonlimiting example and made with reference to the drawings in which.

DETAIL DESCRIPTION OF EMBODIMENTS OF THE INVENTION

Figure 1:
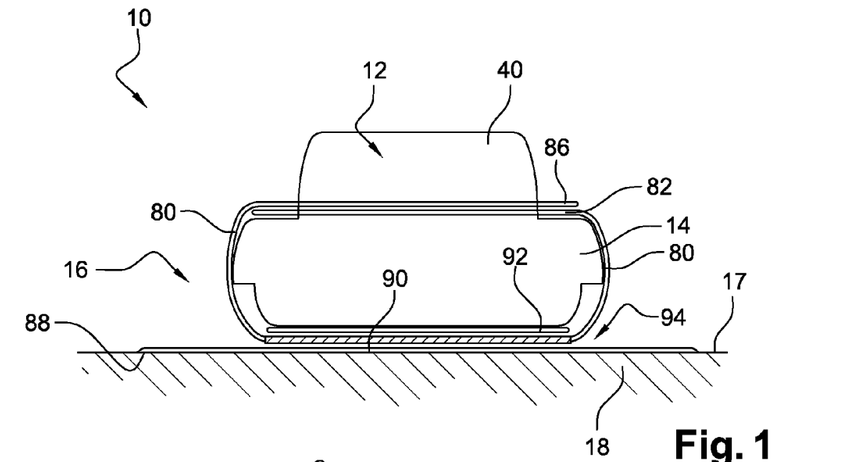
FIG. 1 illustrates a pressure-measurement device according to a first embodiment, attached to a tyre.

FIG. 1 depicts a device according to a first embodiment and denoted by the overall reference 10. The device 10 comprises a pressure-measurement member 12 and a protective housing 14 for protecting the measurement member 12. The device 10 also comprises means 16 for securing the protective housing 14 to an internal surface 17 of a tyre 18. The tyre 18 is used for construction work applications.

Figures 2, 3:
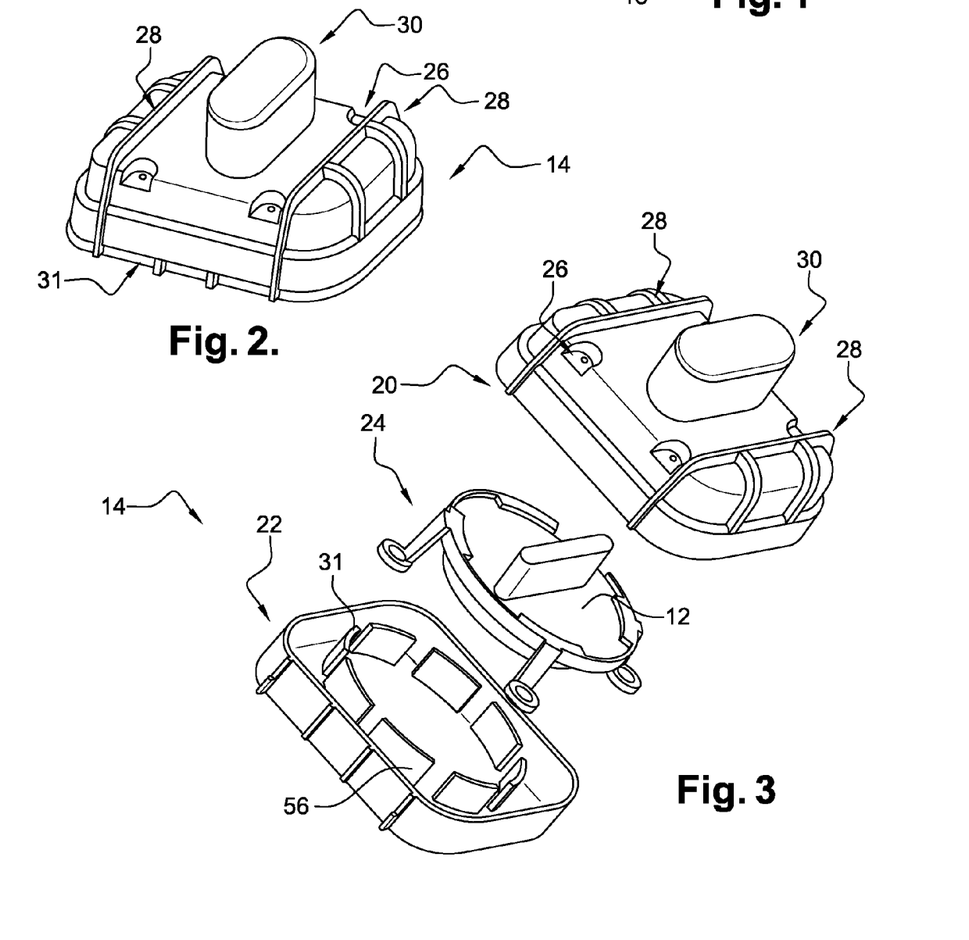
FIG. 2 is a perspective view of the device of FIG. 1.
FIG. 3 is an exploded perspective view of the device of FIG. 2.
Figures 4, 5, 6:
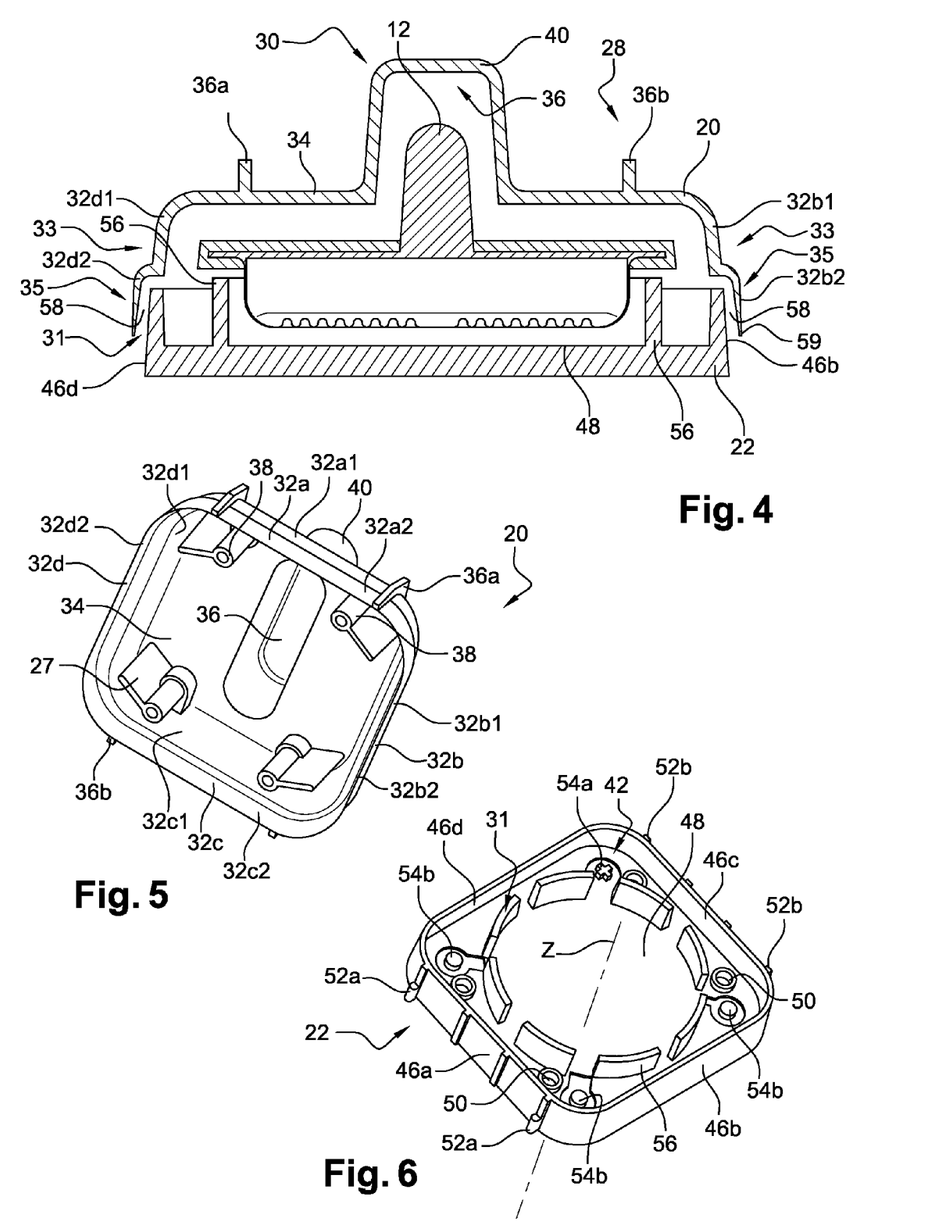
FIG. 4 is a view in cross section of the device of FIG. 2.
FIGS. 5 and 6 are perspective views of first and second parts of a housing of the device of FIGS. 1 to 4.

With reference to FIGS. 2 to 4, the protective housing 14 comprises first and second parts 20, 22. The device 10 comprises a positioning support 24 for positioning the member 12 in the housing 14. The parts 20, 22 are able to move, in this particular instance are able to be detached, relative to one another and are arranged in such a way that they allow air to communicate between the outside and the inside of the housing 14 when they are assembled, for example via a space between the two parts 20, 22. The parts 20, 22 are able to move one relative to the other between a position for inserting the member 12 into the housing (FIGS. 3, 5, 6) and a position for holding the member 12 in the housing 14 (FIGS. 2, 4). The housing 14 is of parallelepipedal overall shape. The housing 14 comprises means 26 for securing the first and second parts to one another and bracing means 27 for bracing the first and second parts relative to one another. The housing 14 comprises guide means 28 for guiding the means 16 and catching means 30 for catching the means 16. Finally, the housing 14 comprises means 31 for the dimensional filtration of the air entering the housing 14.

With reference to FIGS. 4 and 5, the first part 20 has a parallelepipedal overall shape and is delimited by four protective walls 32a-d which are parallel in pairs. The walls 32a-d are connected by a protective bottom wall 34. The bottom wall 34 comprises an indentation 36 forming a seating. Each wall 32a-d forms a stepped skirt 33 comprising a portion 32a1-d1 extended by a portion 30a2-d2 forming a skirt 35 that overhangs the second part 22. The overhanging skirt 35 extends over the entire periphery of the first part 20.

The securing 26 and bracing 27 means of the first part 20 comprise legs 38 equipped with through-holes for the passage of screws. The guide means 28 of the first part comprise two ribs 36a-b connecting two opposing walls 32a-c and passing via the bottom wall 34 on the external face of the housing 14. The means 30 comprise a protrusion 40 borne by the wall 34 and that complements the indentation 36.

With reference to FIG. 6, the device 10 comprises positioning means 42 for positioning the support 24. The second part 22 has a parallelepipedal overall shape and is delimited by four protective walls 46a-d which are parallel in pairs. The walls 46a-d are connected by a protective bottom wall 48. The walls 32a-d and 46a-d are not provided with projecting ridges so as not to impair the securing means 26.

The securing 26 and bracing 27 means of the second part 22 comprise tapped through-holes 50 that extend the holes 38 and can lock screws in place. The guide means 28 of the second part comprise two pairs of ribs 52a-b. The ribs 52a-b are carried by two opposing walls 46a-c and are arranged in the continuation of the ribs 36a-b. The positioning means 42 comprise polarizing features 54 borne by the bottom wall 48. The polarizing features comprise first and second types 54a, 54b of polarizing features which respectively are in the shape of a cross and of a circle. The wall 48 bears one polarizing feature 54a of the first type and three polarizing features 54b of the second type.

The means of dimensional filtration 31 comprise ribs 56 extending at right angles to the wall 48 and borne by the bottom wall 48. The ribs 56 form a circle centred around an axis Z and are angularly spaced apart from one another. The angular spacing between the ribs 56 is constant and limits the size of any objects that might enter or accumulate inside the cylindrical volume delimited by the ribs 56. The means 31 of dimensional filtration also comprise a space 58 defined by the parts 20, 22. In this particular instance, the space 58 is defined by the overhanging skirt 35 formed by the portions 32a2-d2 and the side walls 46a-d when the two parts 20, 22 are attached to one another. As depicted in FIG. 4, the space 58 has, in cross section, the overall profile of an elbow between the inside and the outside of the housing 14. The distance separating the portions 32a2-d2 and the walls 46a-d is between 1 and 3 mm.

The overhanging skirt 35 comprises an end peripheral edge 59. The skirt 35 has a tapering profile. In other words, the skirt 35 has a variable thickness that decreases towards the edge 59.

Figure 7:
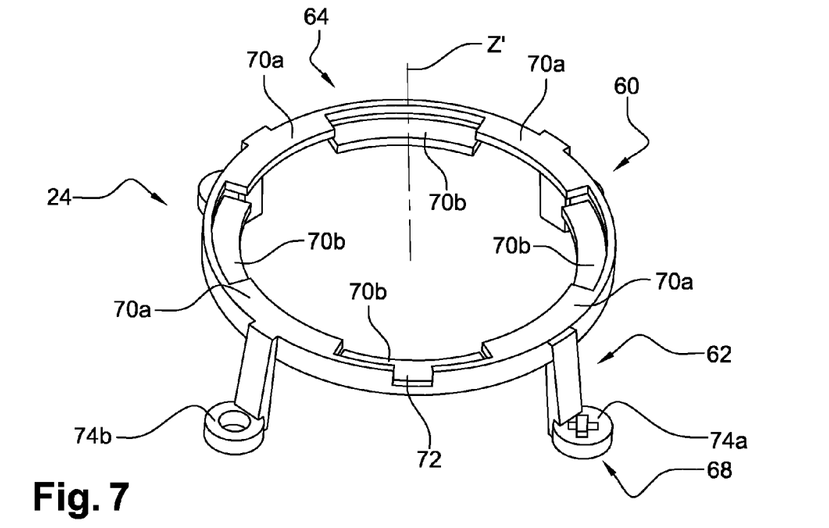
FIG. 7 is a perspective view of a support for the device of FIGS. 1 to 4.

With reference to FIG. 7, the support 24 comprises a part 60 of circular overall shape centred around an axis Z' and legs 62, in this instance four of them, supporting the part 60 and evenly distributed about the part 60. The device 10 comprises means 64 of holding the member 12 in the support 24.

The holding means 64 comprises first and second radial walls 70a, 70b running circumferentially over a predetermined angular width. The walls 70a are axially offset along the axis Z' with respect to the walls 70b. The means 64 also comprise a notch 72 for positioning the member 12 with respect to the support 24.

The positioning means 42 comprise polarizing features 74, that complement the polarizing features 54, borne by each leg 62. The polarizing features 74 comprise first and second types 74a, 74b of polarizing features these respectively being in a shape of a cross and of a circle. One leg bears a polarizing feature 74a of the first type and each other leg bears a polarizing feature 74b of the second type.

The support 24 is made of plastic, for example of polyvinylidine fluoride. This material is flexible enough that the member 12 can be inserted into the support 24 by elastic deformation of the support 24.

Figure 8:
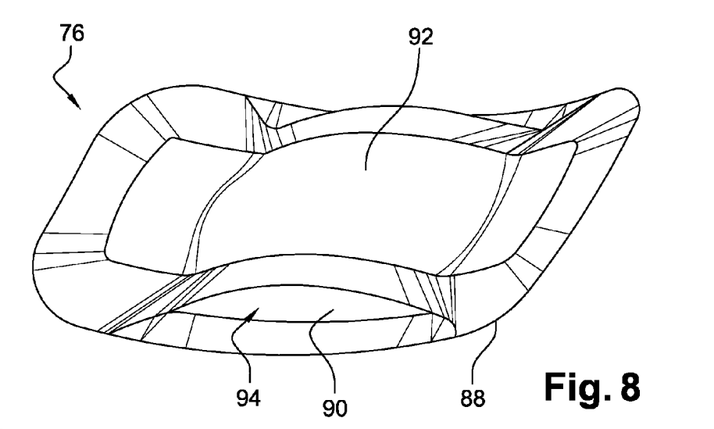
FIGS. 8 and 9 illustrate means of securing the protective housing of FIGS. 2 to 4 to the tyre.
Figure 9:
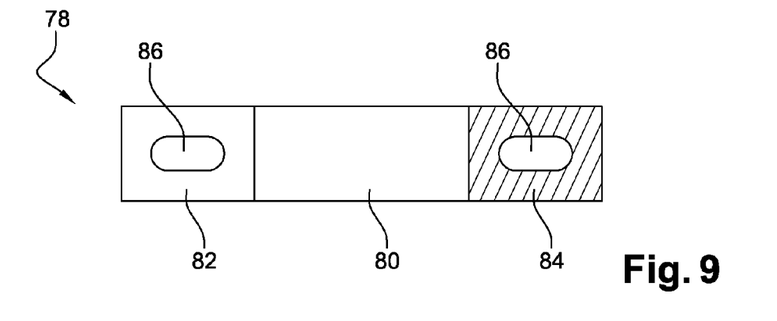

With reference to FIGS. 1, 8 and 9, the securing means 16 comprise a patch 76 and a retaining strip 78. The strip 78 comprises an elastic portion 80 joining together two complementary fastening portions 82, 84 of the hook-loop type known by the tradename Velcro. Each portion 82, 84 also comprises an opening 86 for holding the strip 78 and of a shape and size substantially identical to the shape and size of the protrusion 40.

The patch 76 comprises a face 88 for securing to the tyre 18 and intended to be bonded against the internal surface 17. The patch 76 also comprises a face 90 and a strap 92 for securing the patch 76 to the strip 78. The face 90 and the strap 92 delimit a space 94 through which the strip 78 is passed.

When the device 10 is fitted to the tyre 18, the strip 78 is passed through the space 94. Next, the housing 14 is placed on the strap 92. The strip 78 is passed between the strip 78 guide ribs 36a-b and the protrusion 40 is inserted in turn into each opening 86 as depicted in FIG. 1.

Figure 10:
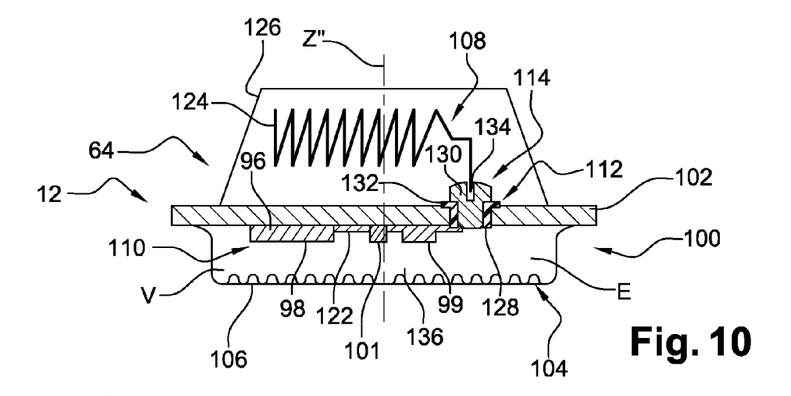
FIG. 10 is a view in cross section of a member of the device of FIGS. 3 and 4.
Figure 11:
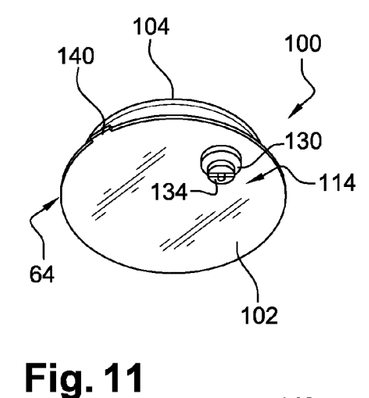
FIGS. 11 and 12 are perspective views of the member of FIG. 10.
Figure 12:
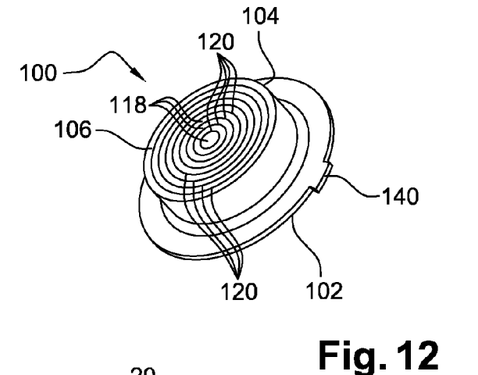

With reference to FIGS. 10 to 12, the member 12 is in the overall shape of a cylinder of revolution about an axis Z". The member 12 comprises a test body 96 bearing a pressure-sensitive deformable surface 98. In the conventional way, the test body 96 subjected to the pressure that is to be measured converts it into some other physical parameter such as a deformation, a displacement, etc. Further, the member 12 comprises processing means 99 for processing the pressure detected by the test body 96. The means 99 notably comprise a microcontroller. The means 99 are sensitive to the physical parameter and intended to convert this detected parameter, for example into an electronic signal. The member 12 also comprises energy storage means 101, in this instance a single cell battery.

The member 12 also comprises a sealed housing 100. The housing 100 comprises a support 102 for the test body 96 and a deformable wall 104 formed by a deformable diaphragm bearing a deformable pressure-measurement surface 106. The diaphragm 104 is attached to the support 102 by welding or bonding. The housing 100 delimits an internal space E. The test body 96 and the means 99, 101 are arranged inside the housing 100.

Furthermore, the member 12 comprises means 108 for the radio frequency communication of data acquired by the member 12, notably of the parameter measured by the test body 96 and processed by the processing means 99. The member 12 comprises means 110 for transmitting the pressure between the pressure-measurement surface 106 of the diaphragm 104 and the deformable surface 98 of the test body 96. The member 12 comprises means 112 for filling the housing 100 and means 114 for plugging the filling means 112.

For preference, the test body 96 comprises an element of the strain gauge type capable of converting the deformation experienced by the deformable surface 98 into an electrical signal destined for the processing means 99. As an alternative, the test body 96 contains an element of the piezoelectric type.

The surface 106 is functionally connected to the test body 96, in this instance to the surface 98, so that when a pressure is applied to the surface 106, this pressure is transmitted to the test body 96, in this instance to the surface 98.

To this end, the transmission means 110 are intended to transmit the pressure applied to the pressure-measurement surface 106 to the deformable surface 98.

The diaphragm 104 is in the overall shape of a spheroid which is flattened at its top. The diaphragm 104 comprises concentric circular portions 118 separated from one another by concentric circular grooves 120. The grooves 120 are equidistant from one another in pairs. As illustrated in FIGS. 4 and 10, the wall 104 of the sealed housing 100 has, in cross section, at least one portion displaying a substantially sinusoidal profile.

The diaphragm 104 is made of stainless steel and the surface 106 is coated with an inert metal film, for example of gold, palladium or platinum.

The support 102 forms one wall of the housing 100 and is made of ceramic. The member 12 comprises an electronic circuit 122 of copper tracks etched into the support 102. The support 102 bears the processing means 99 which are connected to the test body 96, to the transmission means 110 and to the energy storage means 101 via the circuit 122.

The communication means 108 comprise an antenna 124 of the coiled type. This type of antenna makes it possible to obtain a relatively effective radiating pattern in a small volume. The antenna 124 is situated outside the internal space E. The member 12 also comprises a housing 126 to protect the antenna 124 and in which this antenna is encapsulated. The housing 126 is attached to the housing 100, in this instance the support 102, and is made of a material that displays a dielectric constant of between 1 and 5, for example a thermosetting polyurethane.

The filling means 112 comprise a filling orifice 128 for filling the housing 100 formed in the support 102. The orifice 128 is plugged by the plugging means 114, in this instance by a plugging member 130 forcibly screwed into a screw thread 132 borne by the support 102. The member 130 has an orifice 134 for holding the antenna 124 and is made of an electrically conducting material so as to transmit the electrical signals from inside the housing 14 to outside the housing 14. The member 130 is made of a material that allows the antenna 124 to be welded into the orifice 134. The member 130 is therefore electrically and mechanically connected to the antenna 124. The housing 100 is filled with a product in liquid phase, under vacuum, at a temperature of between 50° C. and 80° C. to ensure that the product perfectly penetrates the entire space E, including the spaces between the electronic components of the circuit 122.

As an alternative, the housing 100 is filled with a product at a first temperature of between 50° C. and 80° C. This product is crosslinkable. At this temperature and during this filling step the product is in a liquid phase. The product may be a single-component, two-component or multi-component product. Next, the product is left to crosslink at a second temperature. The product then forms a material in a gel phase. As an alternative, the product is left to crosslink at the first temperature.

In operation, the transmission means 110 comprise a substantially incompressible material 136 occupying all of the internal space E.

In this particular instance, the incompressible material 136 is in a liquid and/or gel phase in a range of temperatures of between −20° C. and +150° C. The material 136 is dielectric so that it does not electrically interfere with the electric signals of the circuit 122, notably the test body 96 or the processing means 99. In the case of a liquid, the material is chosen from ester based or glycerine based oils. In the case of a gel, the material used is known by the reference TSE 3062 manufactured by the company Momentive.

The means 64 comprise a tab 140 for positioning the member 12. This tab 140 complements the notch 72 of the support 24.

With reference to FIG. 4, the protective wall 48 faces the surface 106. The support 24 and the housing are arranged in such a way that the pressure-measurement surface 106 is positioned some distance away from the wall 48 of the housing. In this particular instance, the height of the support 24, here that of the radial walls 70b, is greater than the height of the diaphragm 104. When the device 10 is in the assembled position, the axes Z, Z' and Z" are substantially coincident. The ribs 56 also perform a function of acting as an end stop for the axial movement of the support 24. Specifically, because the legs 62 are flexible, they are able to flex. To prevent the pressure-measurement surface 106 from touching the wall 48, the ribs 56 limit the axial movement of the support 24 and therefore of the housing 100.

Figure 13:
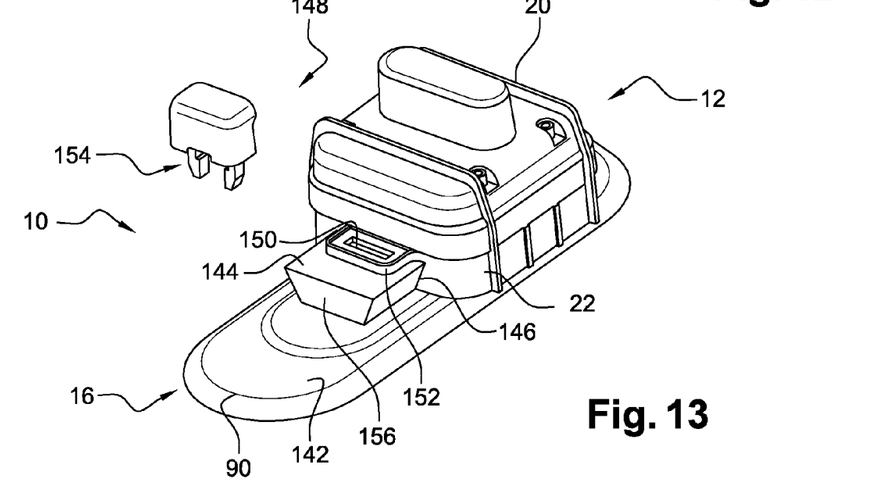
FIG. 13 illustrates a pressure-measurement device according to a second embodiment.

FIG. 13 depicts a device according to a second embodiment of the invention. Elements that are analogous with those depicted in the previous figures are denoted by identical references.

In this second embodiment, the securing means 16 comprise a patch 142 bearing a male slide of trapezoidal section 144 on its face 90. The means 16 also comprise a slide, of female trapezoidal section, 146 formed in the second part 22. The device 10 according to the second embodiment also comprises means 148 of locking the housing 14 with the patch 142. The locking means 148 comprise an oblong orifice 150 formed in a lug 152 borne by one of the walls of the part 22. The means 148 also comprise a pair of elastic hooks 154 intended to be inserted into the orifice 150 when the orifice 150 passes beyond a locking wall 156 of the male slide 144.

The invention is not restricted to the embodiments previously described.

In particular, a device 14 could be used that has a means of connection other than those described in the first and second embodiments. Likewise use could be made of a member 12 with a protective housing other than the one described in the first and second embodiments.

It will be noted that use may be made of a tyre pressure-measurement member protective housing comprising:

first and second parts that can be moved relative to one another between a position for inserting the member into the housing and a position for holding the member in the housing, the first and second parts being arranged in such a way that they allow air to communicate between the outside and the inside of the housing when they are in the holding position;

means for filtering the air entering the housing and comprising a space for the passage of air between the outside and the inside of the housing defined by the first and second parts, independently as to whether or not the pressure-measurement member comprises:

a pressure-measurement surface functionally connected to a test body, a sealed pressure-measurement housing in which the test body is arranged, the pressure-measurement surface being carried by a wall of the sealed pressure-measurement housing lying some distance from the test body, the sealed pressure-measurement housing delimiting a space internal to the housing;

pressure-transmission means that transmit the pressure between the pressure-measurement surface and the test body and comprising a substantially incompressible material occupying all of the internal space;

energy storage means and pressure processing means for processing the pressure detected by the test body and arranged in the sealed housing.

The invention claimed is:

1. A pressure-measurement member, comprising:
a pressure-measurement surface functionally connected to a test body;
a sealed pressure-measurement housing in which the test body is arranged, the pressure-measurement surface being carried by a wall of the sealed pressure-measurement housing and positioned at a distance from the test body, the sealed pressure-measurement housing and a support of the test body delimiting an internal space, which is a space internal to the sealed pressure-measurement housing, and which is a space in which the test body is arranged;
a pressure-transmission object that transmits a pressure between the pressure-measurement surface and the test body, the pressure-transmission object including a material that is in one or both of a liquid phase and a gel phase during a measurement, the material occupying all of the internal space; and
a processor for processing pressure data detected by the test body, the processor being arranged in the sealed pressure-measurement housing and being connected to an energy source.

2. The member according to claim 1, further comprising a radio frequency communications device that includes an antenna positioned outside of the internal space occupied by the material.

3. The member according to claim 2, wherein the sealed pressure-measurement housing includes a filling orifice for filling the sealed pressure-measurement housing, the filling orifice being configured to be plugged by an electrically conducting plugging member to which the antenna is connected.

4. The member according to claim 1, wherein the wall of the sealed pressure-measurement housing includes concentric grooves.

5. The member according to claim 4, wherein the concentric grooves are equidistant from one another in pairs.

6. The member according to claim 1, wherein the pressure-measurement surface is covered with an inert metal film.

7. The member according to claim 6, wherein the inert metal film includes at least one of: gold, palladium, and platinum.

8. The member according to claim 1, further comprising a support for supporting the test body, the support forming one wall of the sealed pressure-measurement housing.

9. The member according to claim 8, wherein the support is formed of a ceramic material.

10. The member according to claim 1, wherein the material is in one or both of a liquid phase and a gel phase in a temperature range of between −20° C. and +150° C.

11. The member according to claim 10, wherein the antenna is encapsulated in a material that has a dielectric constant of between 1 and 5.

12. The member according to claim 1, wherein the member is incorporated in a tyre.

13. A pressure-measurement device, comprising:
a pressure-measurement member; and
a protective housing to protect the pressure-measurement member,
wherein the pressure-measurement member includes:
   a pressure-measurement surface functionally connected to a test body,
   a sealed pressure-measurement housing in which the test body is arranged, the pressure-measurement surface being carried by a wall of the sealed pressure-measurement housing and positioned at a distance from the test body, the sealed pressure-measurement housing and a support of the test body delimiting an internal space, which is a space internal to the sealed pressure-measurement housing, and which is a space in which the test body is arranged,
   a pressure-transmission object that transmits a pressure between the pressure-measurement surface and the test body, the pressure-transmission object including a material that is in one or both of a liquid phase and a gel phase during a measurement, the material occupying all of the internal space, and
   a processor for processing pressure data detected by the test body, the processor being arranged in the sealed pressure-measurement housing and being connected to an energy source.

14. The device according to claim 13, further comprising a support for positioning the pressure-measurement member in the protective housing, wherein
   the protective housing includes at least one protective wall facing the pressure-measurement surface, and
   the protective housing and the support are arranged so that the pressure-measurement surface is positioned at a distance away from the at least one protective wall.

15. The device according to claim 14, wherein the protective housing includes first and second parts that are separable from one another and arranged so that they allow air to communicate between outside and inside of the protective housing.

16. The device according to claim 13, wherein the protective housing includes first and second parts that are separable from one another and arranged so that they allow air to communicate between outside of and inside of the protective housing.

17. The device according to claim 13, wherein the protective housing includes a filter for dimensional filtration of air entering the protective housing.

18. The device according to claim 13, wherein the device is incorporated in a tyre.

* * * * *

UNITED STATES PATENT AND TRADEMARK OFFICE
CERTIFICATE OF CORRECTION

| | | |
|---|---|---|
| PATENT NO. | : 9,476,789 B2 | Page 1 of 1 |
| APPLICATION NO. | : 13/498754 | |
| DATED | : October 25, 2016 | |
| INVENTOR(S) | : Jonathan Champredonde et al. | |

It is certified that error appears in the above-identified patent and that said Letters Patent is hereby corrected as shown below:

Column 6
Line 27, "first part" should read --first part 20--.
Line 47, "features" should read --features 54--.

Column 9
Line 30, "housing" should read --housing 14--.

Signed and Sealed this
Seventeenth Day of October, 2017

Joseph Matal
*Performing the Functions and Duties of the
Under Secretary of Commerce for Intellectual Property and
Director of the United States Patent and Trademark Office*